United States Patent

King et al.

[11] Patent Number: 6,116,369
[45] Date of Patent: Sep. 12, 2000

[54] ADAPTIVE CRUISE CONTROL SYSTEM

[75] Inventors: Paul John King, Leicester; Michael Julian Richardson, Redditch; Daniel Watts, Coventry, all of United Kingdom

[73] Assignee: Jaguar Cars, Limited, Whitley Coventry, United Kingdom

[21] Appl. No.: 09/135,256

[22] Filed: Aug. 17, 1998

[30] Foreign Application Priority Data

Aug. 20, 1997 [GB] United Kingdom .................. 9717532

[51] Int. Cl.[7] ................................................. B60K 31/00
[52] U.S. Cl. ............................ 180/169; 180/171; 701/96
[58] Field of Search ................................. 180/167, 169, 180/171, 179, 170; 701/93, 96, 97

[56] References Cited

U.S. PATENT DOCUMENTS

| | | | |
|---|---|---|---|
| 4,621,705 | 11/1986 | Etoh ........................................ | 180/169 |
| 4,947,952 | 8/1990 | Kajiwara ............................. | 180/169 X |
| 5,454,442 | 10/1995 | Labuhn et al. .......................... | 180/169 |
| 5,594,645 | 1/1997 | Nishimura et al. .................. | 180/169 X |
| 5,695,020 | 12/1997 | Nishimura ............................... | 180/169 |
| 5,761,629 | 6/1998 | Gilling ....................................... | 701/96 |
| 5,771,007 | 6/1998 | Arai et al. ............................ | 180/169 X |
| 5,781,103 | 7/1998 | Gilling ................................ | 180/169 X |
| 5,839,534 | 11/1998 | Chakraborty et al. .................. | 180/169 |

*Primary Examiner*—Michael Mar
*Attorney, Agent, or Firm*—Carlos L. Hanze

[57] ABSTRACT

An adaptive cruise control system 1 for a vehicle 3, is capable of operating in at least two modes, a Cruise mode in which the speed of the vehicle 3 is controlled to maintain a set speed, and a Follow mode in which the speed of the vehicle 3 is controlled to maintain a set distance from the preceding target vehicle 5. The system 1 includes means 7 to switch from Cruise mode to Follow mode if a target vehicle 5 is detected within a predetermined distance 9 of the vehicle 3, and a driver display interface 11 for displaying the mode of operation of the adaptive cruise control system 1. A change anticipation system 13 detects when the system operation is about to change mode from Cruise to Follow and causes the display interface 11 to display to the driver that the mode change is about to occur, prior to the system change to allow the driver to take avoiding action.

9 Claims, 2 Drawing Sheets

ADAPTIVE CRUISE CONTROL SYSTEM

FIELD OF THE INVENTION

The present invention relates generally to an adaptive cruise control system for a motor vehicle, and more specifically to a driver interface in a cruise control system having a cruise mode and a follow mode.

Conventional cruise control systems fulfill the function of automatic speed control of a vehicle. A desired speed is selected by the driver and a control system operates on the engine (usually the throttle only) to maintain the desired speed. When the traffic is light, this simple speed control is acceptable to the driver, however, if the traffic is heavy the driver is faced with constantly adjusting the set speed in order to maintain a safe distance from preceding traffic and may have to disengage the cruise control in order to brake.

Many systems have now been developed by the addition of a distance sensor to the conventional cruise control system which adds distance keeping to the basic speed control function. Many such systems also include means to monitor the relative velocities of the vehicle and a target preceding vehicle. Moreover the engine control also often includes a limited authority braking system, so that the speed control/distance keeping can be effected by a combination of the throttle and the brake. Such a system may operate as an adaptive cruise control system which operates in Cruise Mode when traffic is light controlling only the speed of the vehicle and then switched automatically into Follow Mode keeping a safe distance from the preceding vehicle once a target vehicle is within a predetermined range of the front of the vehicle.

The Human-Machine Interface (HMI) in an ACC (adaptive cruise control) vehicle is used to indicate to the driver how the vehicle is performing, whether the system is reacting to the vehicle that is in the vehicle path or not, the current vehicle set speed and other system information. The information presented in the HMI will influence the way that the driver makes use of the system.

Dynamically, the ACC vehicle can be in one of two states, either CRUISE mode acting like conventional cruise control and controlling the vehicle to a desired driver set speed, or it is in FOLLOW mode where the speed of the vehicle is reduced below the set speed because of another vehicle or object in the vehicle's path within a set range. To indicate this change from one state to another, conventionally the HMI includes a driver display pack which displays icons or messages to the driver. From studies carried out, drivers of adaptive cruise control systems prefer that the icon changes when the dynamics of the vehicle changes, so that the icon change is tied to the control change. However this can cause problems for the driver when approaching a vehicle in the same lane. He can use the icon change as a visual cue to determine the point to start the overtaking maneuver. If the driver waits for the icon change, then the control system has already started to slow the vehicle down making it difficult to reaccelerate and overtake the slower moving vehicle smoothly.

Systems have been proposed which when a vehicle is detected in the same lane, initially accelerate the vehicle to allow the driver to overtake. However this can cause problems when the traffic is heavy and it is impossible to overtake. In such conditions, the initial acceleration means that in order to maintain a safe distance sharper deceleration of the vehicle will be required, detracting from the smooth drive of the vehicle.

SUMMARY OF THE INVENTION

According to the invention there is provided an adaptive cruise control system for a vehicle, capable of operating in at least two modes, a first Cruise mode in which the speed of the vehicle is controlled to maintain a set speed, and a second Follow mode in which the speed of the vehicle is controlled to maintain a set distance from the preceding target vehicle. The system includes means to switch from Cruise mode to Follow mode if a target vehicle is detected within a predetermined distance of the vehicle. A driver display interface displays the mode of operation of the adaptive cruise control system. A change anticipation system detects when the system operation is about to change mode from Cruise to Follow and causes the display interface to display to the driver that the mode change is to occur, prior to the system change to allow the driver to take avoiding action.

Thus, before the vehicle enters Follow mode and starts to decelerate to maintain a set distance from the preceding vehicle, the driver has sufficient time to accelerate or change lanes to overtake if the road conditions allow. However, if road conditions do not allow and the driver does not intervene, Follow mode is quickly entered to allow smooth deceleration.

The change anticipation system may include a sensor which senses when an obstruction is within an anticipation range in front of the vehicle, with the anticipation range being larger than the range within which Follow mode will be initiated. The period between the display to the driver and the start of Follow mode may be a predetermined period of time or may be the period between the obstruction entering the anticipation range and the obstruction entering the Follow initiation range.

Preferably, the period is a predetermined time period, ensuring that the driver has sufficient time to make a decision to overtake and to carry out the overtaking maneuver.

Preferably, the anticipation period is dependent upon the radius of curvature of the road. On a straight road the driver will get maximum anticipation time and on bends the amount of time is reduced to a minimum. The reasons for this are that the driver will be less likely to make a lane change maneuver on a bend, and the performance on a bend will be reduced by the tracking ability of the radar sensor on a bend on the road.

The display system may just include two icons, one which when illuminated indicates Cruise mode and the other which indicates Follow mode. In such a system, the message to the driver is merely the early illumination of the Follow icon, so that the Follow icon is illuminated before the adaptive cruise control system switches to Follow mode.

Alternatively the system may include a third display icon which when illuminated indicates to the driver that he should consider overtaking.

A further problem which may arise in an adaptive cruise control system is when a preceding vehicle traveling in the same lane travels at a speed which varies above and below the target cruise speed of the ACC vehicle. The ACC system may then flicker between Cruise and Follow modes. The driver display interface may then distract the driver, apart from the continuous acceleration/deceleration of the vehicle. The anticipation system may be used to alleviate this problem, especially if it is arranged to sense when the mode is to change from Follow to Cruise.

The reason is that a vehicle traveling at a speed which varies around the cruise target speed will typically cross the edge of the anticipation range before it reaches the edge of the Follow initiation range. Thus, when it crosses the edge of the anticipation range the system will switch from 'about to change to Follow' to 'about to change to Cruise'.

Preferably, in such a case the system includes means to detect that the anticipation system is in operation for over a predetermined time and provide a display to the driver to alert him of the situation. The display may state, for example, "Target vehicle traveling at about Cruise speed". The driver may then take avoiding action, which dependent upon road conditions may be to accelerate to overtake, or to reset the target cruise speed to a lower level.

DETAILED DESCRIPTION OF PREFERRED EMBODIMENTS

Figure 1:
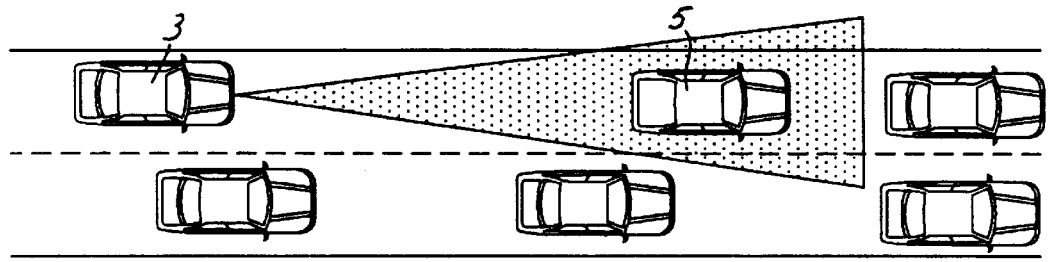
FIG. 1 is a schematic view illustrating the vehicle traveling along a road showing target vehicles.

An adaptive cruise control system 1 (shown in FIG. 3) for a vehicle 3 (shown in FIGS. 1 and 2), is capable of operating in at least two modes; a Cruise mode in which the speed of the vehicle 3 is controlled to maintain a set speed, and a Follow mode in which the speed of the vehicle 3 is controlled to maintain a set distance from the preceding target vehicle 5. System 1 includes means 7 to switch from Cruise mode to Follow mode if a target vehicle 5 is detected within a predetermined distance 9 of the vehicle 3, and a driver display interface 11 for displaying the mode of operation of the adaptive cruise control system 1. System 1 includes a change anticipation system 13 which detects when the system operation is about to change mode from Cruise to Follow and causes the display interface 11 to display to the driver that the mode change is about to occur, prior to the system change to allow the driver to take avoiding action.

System 1 includes a speed sensor 15 which detects the speed of the vehicle 3, and a distance sensor 17 which detects the distance between the vehicle 3 and the next preceding or target vehicle 5. Both such sensors are conventional, the choice of which would be apparent to those skilled in the art.

The speed sensed is fed to a 'Cruise controller' 19 which compares the speed of the vehicle with the set speed, and if it is not equal to the set speed feeds a controlling signal to the engine controller 21. Many cruise controllers and means for governing the vehicle speed are known and these will be conventional.

The distance sensed is fed to a 'Follow controller' 23 which compares the distance with the predetermined Follow initiation distance or control headway 9. If there is a target vehicle within the range 9, a signal is sent to the switch means 7 which switches the mode of operation from Cruise to Follow and overrides the signal from Cruise controller 19.

If the distance sensed is greater than the range 9 but within anticipation range 25, a signal is fed to the change anticipation system 13 which does not override the signal from Cruise controller 19 but feeds a signal to the display interface 11 to indicate that Follow mode is to be entered.

Figure 4:
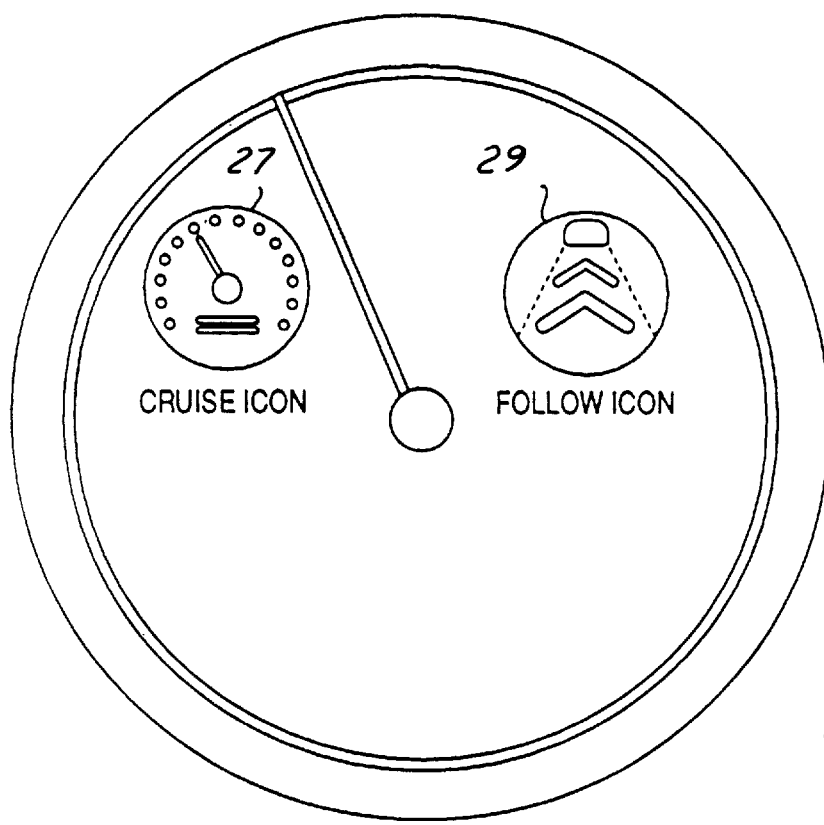
FIG. 4 is a schematic view of the driver display interface.

The driver display interface 11 as shown in FIG. 4 includes two icons 27 and 29. A first icon 27 indicates that the vehicle is in Cruise mode and the second icon 29 indicates that the vehicle in Follow Mode. In operation, the Follow Icon 29 is illuminated before Follow mode is initiated, when the change anticipation system 13 has detected a target vehicle 5 in anticipation range 25. This allows the driver to take avoiding action if possible by overtaking the target vehicle 5 before the vehicle starts to decelerate in response to the Follow signal from Follow Controller 23 overriding the speed control of the engine controller 21.

Figure 2A:
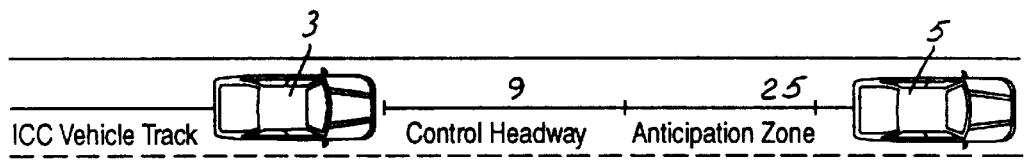
FIGS. 2A, B and C are schematic views of the vehicle and a target vehicle within different ranges of the vehicle.
Figure 3:
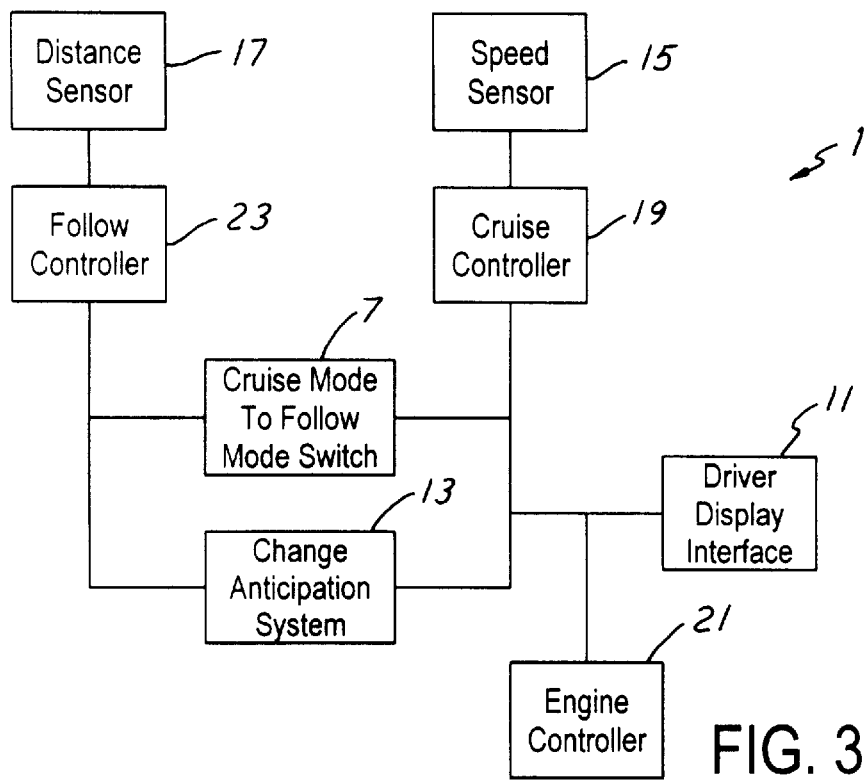
FIG. 3 is a block diagram of the system.

FIG. 2A illustrates the position when the vehicle 3 is traveling in Cruise Mode. The target vehicle 5 is outside both the predetermined Follow initiation distance 9 and the anticipation distance 25.

Figure 2B:
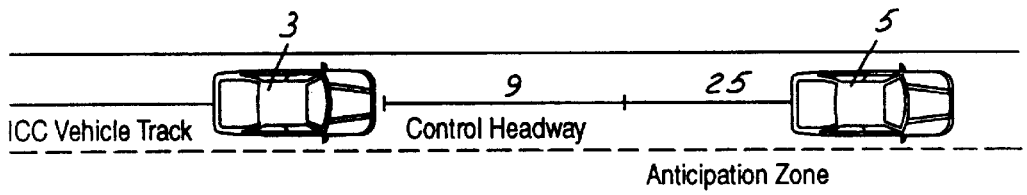

In FIG. 2B, the target vehicle 5 is closer to the vehicle 3 and is within the anticipation range 25 but still outside range 9. In this case, the vehicle will still be operating in Cruise Mode, but the driver display interface 11 will illuminate the Follow Icon 29, to alert the driver that he may wish to avoid the preceding vehicle 5 by overtaking.

Figure 2C:
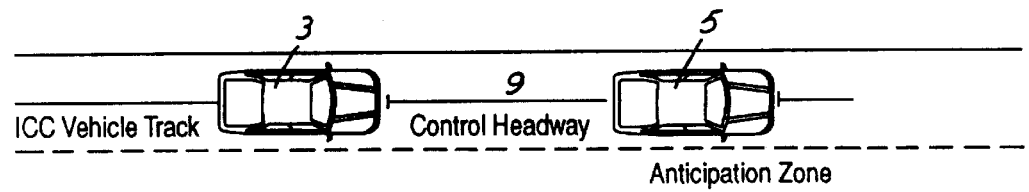

Since the road conditions do not always allow, as seen in FIG. 1, if the target vehicle 5 is not overtaken, it will then enter the Follow initiation range 9 (as shown in FIG. 2C) and Follow mode will be entered when the vehicle will start to decelerate.

What is claimed is:

1. An adaptive cruise control system for a vehicle capable of operating in at least two modes, a cruise mode in which the speed of said vehicle is controlled to maintain a set speed, and a follow mode in which the speed of said vehicle is controlled to maintain a set distance from a preceding target vehicle, said system comprising:

switch means for automatically switching from said cruise mode to said follow mode in response to detection of said target vehicle within a predetermined distance of said vehicle;

a driver display interface for displaying said mode of operation of said adaptive cruise control system; and a change anticipation system for detecting when said mode is about to change from said cruise mode to said follow mode, and for causing said driver display interface to display to a driver that said mode change is about to occur, prior to said mode being changed by said switch means, to allow said driver to take any avoiding action which may be necessary.

2. The adaptive cruise control system of claim 1 further comprising a sensor detecting when said target vehicle is within an anticipation distance in front of said vehicle.

3. The adaptive cruise control system of claim 2 wherein a predetermined period of time is established between said display interface displaying that said mode change is about to occur and an actual change to said follow mode.

4. The adaptive cruise control system of claim 2 wherein a period between said display interface displaying that said mode change is about to occur and an actual change to said follow Mode is the same period between when said target vehicle enters said anticipation distance and said target vehicle enters said predetermined distance.

5. The adaptive cruise control system of claim 3 wherein said anticipation period is dependent upon a radius of curvature of a road being traversed.

6. The adaptive cruise control system of claim 1 wherein said display interface includes two icons, one of which when illuminated indicates cruise mode and another of which when illuminated indicates follow mode and wherein said follow mode icon is illuminated when said change anticipation system detects that a change from said cruise mode to said follow mode is about to occur.

7. A method for controlling the speed of a vehicle comprising the steps of:

operating said vehicle in a first mode at a set speed when said vehicle is greater than a set distance behind a preceding target vehicle;

operating said vehicle in a second mode at a reduced speed when said vehicle is within said set distance so as to maintain said set distance behind said target vehicle;

determining when said first mode is about to change to said second mode in response to said target vehicle being detected within said set distance of said vehicle;

automatically switching from said first mode to said second mode when the mode change has been determined; and indicating to a driver of said vehicle, prior to the change from said first mode to said second mode, that the automatic switching from said first mode to said second mode is about to occur so as to allow the driver to take any avoiding action which may be necessary.

8. The method according to claim 7, further comprising the step of detecting when said target vehicle is within an anticipation distance in front of said vehicle.

9. The method according to claim 7, further comprising the step of establishing a predetermined period of time between said indicating step and an actual change to said second mode.

* * * * *